United States Patent [19]
Wecke et al.

[11] Patent Number: 5,622,253
[45] Date of Patent: Apr. 22, 1997

[54] SAFETY SWITCH

[75] Inventors: Rolf Wecke, Bückeburg; Roland Mönnings, Porta Westfalica; Ralph Hoppmann, Minden, all of Germany

[73] Assignee: Hans Bernstein Spezialfabrik für Schaltkontakte GmbH & Co., Porta Westfalica, Germany

[21] Appl. No.: 537,475

[22] Filed: Oct. 2, 1995

[30] Foreign Application Priority Data

Oct. 13, 1994 [DE] Germany ............... 44 36 579.9

[51] Int. Cl.$^6$ ............................................. H01H 27/00
[52] U.S. Cl. ............................ 200/43.07; 200/43.04
[58] Field of Search ......................... 200/43.04, 43.06, 200/43.05, 43.07, 43.08, 43.11, 43.13, 43.16, 43.17, 43.01

[56] References Cited

U.S. PATENT DOCUMENTS

| | | | |
|---|---|---|---|
| 3,858,018 | 12/1974 | Welley | 200/43.04 |
| 5,272,279 | 12/1993 | Filshie | 174/50 |
| 5,420,385 | 5/1995 | Cooper | 200/43.04 |
| 5,464,954 | 11/1995 | Kimura et al. | 200/43.04 |
| 5,473,127 | 12/1995 | Falcon et al. | 200/43.04 |

*Primary Examiner*—David J. Walczak
*Attorney, Agent, or Firm*—Henry M. Feiereisen

[57] ABSTRACT

A safety switch with a contact-carrying spring-loaded plunger includes in a housing portion with two access openings for selective insertion by an actuator. Accommodated in the housing portion is a switching and locking mechanism with a switch wheel that is rotatably mounted on an axle. Positioned in a cutout on each side of the switch wheel is a locking member which is displaceably disposed against the force of a spring substantially radially to the axle. The locking member has two ramp surfaces respectively associated to the access openings and adapted for cooperation with the actuator for shift in radial direction. Each locking member has a locking zone in form of a keyed bore in the passage area of the axle to cooperate with a keyed portion of the axle to securely fix the axle in place.

31 Claims, 6 Drawing Sheets

SAFETY SWITCH

BACKGROUND OF THE INVENTION

The present invention relates to a safety switch for operating a contact-bearing plunger.

In general, a safety switch includes a housing in which the contact-bearing plunger is mounted for spring-loaded to and fro motion by means of a rotatable switch wheel that is actuated by an actuator of particular configuration. The housing is formed with two lateral access openings for enabling selective insertion of the actuator to act upon the switch wheel. Arranged on both sides of the switch wheel are spring-loaded locking members which tend to bar a rotation of the switch wheel and release the switch wheel only after the actuator moves the locking members against the spring force to a release position.

Such safety switches are employed to cut a current supply, for example, when a protective cover is removed from an apparatus or a machine or when equipment doors are opened. In order to provide for such functional security, precautions should be undertaken to prevent unauthorized personnel or unintended operation of the switch by means of an actuator that can be simply copied or emulated and utilized. It is desirable that such safety switches be designed to be user-friendly and to minimize the number of models required, such that, for example, they can be accessed from two different sides because the manufacturer of such safety switches is not generally aware of the location and manner a safety switch ultimately will be installed.

German Pat. Nos. DE 31 00 862 C2, DE 33 30 109 C2 disclose safety switches of this general type, with the switch wheel being essentially divided into several sections. A center section cooperates with the contact-bearing plunger while lateral sections of the switch wheel can be displaced against a return spring force parallel to the axis of rotation of the switch wheel by means of an actuator that can be admitted through openings on two different sides of the housing, such that projections on the plunger which cooperate with stop faces on the lateral sections become disengaged from these stop faces. The switch wheel can thereby be rotated away from a middle position in one sense or the opposite sense by utilizing one access opening or the other for respectively actuating the switch.

As elements of the switch wheel itself assume locking functions and operate in two different directions, many degrees of freedom are required. Thus, the security of operation has room for improvement. Moreover, the displacement of the switch wheel sections involved in locking in a direction parallel to the axis of rotation of the switch wheel considerably increases the dimensions of such a safety switch.

Other safety switches of essentially comparable construction are known that are provided with locking members on both sides of the switch wheel or a control cam and move in a plane perpendicular to the axis of rotation of the switch wheel. A locking mechanism of this type includes highly complex gear trains with numerous parts that are expensive to produce and to assemble, and the use of rocker arms, pivot pins and similar parts makes them susceptible to outside forces. Furthermore, in such safety switches the locking members are laterally outside the switch wheel and are guided by the adjoining housing so that the access openings must be correspondingly wide. Security against manipulation is only two dimensional since e.g. both locking members can be operated by two screwdrivers, and an appropriate insertion leaves sufficient space for operating the switch wheel. Thus, despite the complicated construction, the security against manipulation needs also in this case further improvement.

SUMMARY OF THE INVENTION

It is an object of the present invention to provide an improved safety switch of the foregoing general type, obviating the afore-stated drawbacks.

In particular, it is an object of the present invention to provide an improved safety switch which allows a selection of one of different initiation directions and is characterized by a very high degree of security against manipulation in a relatively simple space saving and compact construction.

These objects and others which will become apparent hereinafter are attained in accordance with the present invention, by mounting a spring-loaded locking member on either side of a switch wheel for rotation therewith, wherein the locking member has contact surfaces that are respectively assigned to the access openings and acted upon by the actuator for movement of the locking members in a substantially radial direction relative to the switch wheel axle between a locking position for inhibiting rotation of the switch wheel through cooperation with a corresponding section of the housing or through locking the switch wheel axle in a non-rotatably manner, and a release position for allowing rotation of the switch wheel.

The two locking members that are integrated in the switch wheel have only a small degree of freedom, and since the locking members are positioned laterally on the switch wheel, the overall construction becomes extremely compact and space saving. Also, only a total of two locking members is required. The displaceability in a radial direction relative to the switch wheel axle on the lateral surfaces of the switch wheel contributes to the compact and narrow construction of the switch.

As the locking members are mounted in the switch wheel and accordingly rotate together with the switch wheel at operation, a significantly degree of security against unauthorized manipulation is accomplished. The reason is because of the requirement to hold the locking members in the release position, after being moved into this release position, during rotation of the switch wheel. As a result, the actuator is highly complex and operates spatially with a three-dimensional layout providing security against unauthorized manipulation that cannot be readily and simply copied. The access opening can be kept extremely narrow. Even when attempting to copy the actuator by making a simple sheet-metal with lateral projections or the like for operating the locking members in the switch wheel, it would not be possible to manipulate the switch as the switch wheel rotates, i.e. would continue to rotate relative to such a sheet metal manipulator tool, to thereby cause the switch wheel to block the use of such a switch-metal manipulator.

According to another feature of the present invention, the switch wheel has a first circumferential recess of relatively small depth in a central area thereof for the plunger, a second circumferential recess of relatively greater depth that is angularly offset to the first recess, and a control cam that connects the first and second recesses. Thus, upon rotation of the switch wheel through admission by the actuator in one of the access openings, the plunger is moved translationally to effect a switching operation. Suitably, the actuator has a functional end in form of a crosslink with keyways on both sides for cooperation with the contact surfaces of the locking members.

In accordance with one embodiment of the present invention, the locking members are swingably mounted to the switch wheel about a pivot axis that is distal from a central passage area of the axle, and have a locking means in the passage area of the axle in form of keyed bore with a circular passageway for the axle and a locking groove at least on one side of the circular passageway for cooperation with keyed surfaces formed on the axle.

Preferably, the locking members are configured as three-armed levers, with one arm rotatably supported on the switch wheel and with the remaining arms being respectively associated to the access openings and formed at their free ends with slanted contact surfaces for cooperation with the crosslink of the actuator.

In accordance with another embodiment of the present invention, the locking members are slidably guided in cutouts on both sides of the switch wheel radially with respect to the axle and provided with a protruding pin that is engageable in a hole in an adjacent portion of the housing when in the locking position.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Throughout all the Figures, the same or corresponding elements are generally indicated by the same reference numerals.

Figure 1:
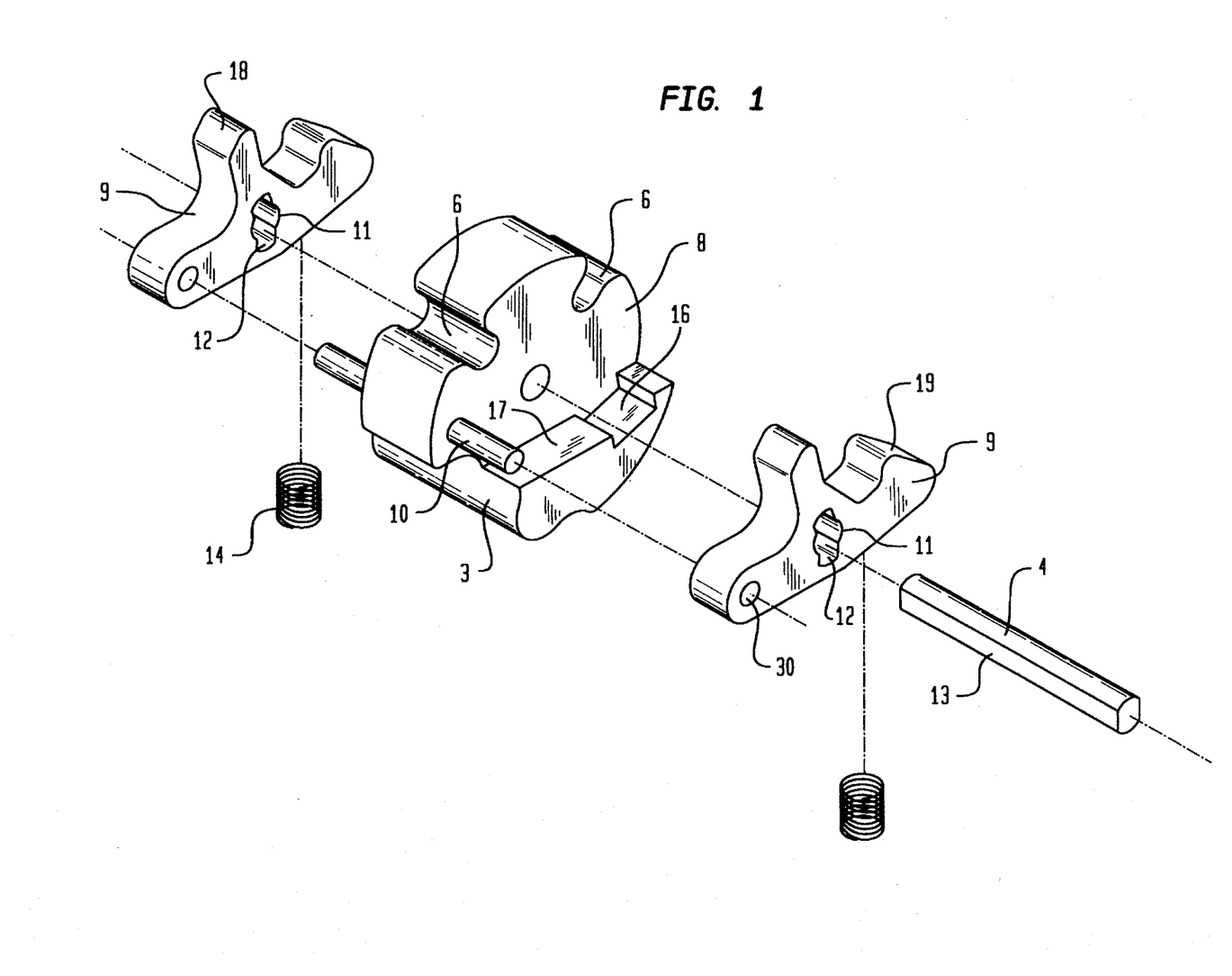
FIG. 1 is an exploded, perspective view of one embodiment of a switching and locking mechanism of a safety switch in accordance with the present invention.

Turning now to the drawing, and in particular to FIG. 1, there is shown an exploded, perspective view of one embodiment of a switching and locking mechanism of a safety switch in accordance with the invention. It will be understood by persons skilled in the art that the basic structure of a safety switch of this type, including the usual electrical switching elements, is generally known and will be described herein only to the extent it is required for the understanding of the present invention.

The safety switch includes a dome-shaped or cap-shaped housing portion 5 (FIG. 2a) in which a spring-loaded switch plunger 1 for actuating the switch contacts is received for translational displacement. The switch plunger 1 can only be operated by means of a specially configured operating key or actuator 2 that is part of the switching and locking mechanism according to the present invention and can be inserted in the housing portion 5 through either of two lateral access openings 7. The actuator 2 is of particular configuration in form of a shackle or stirrup with both shanks being linked at a forward area by a crosslink 23 and having a switch-facing front end forming special keyways 24.

Figure 2A:
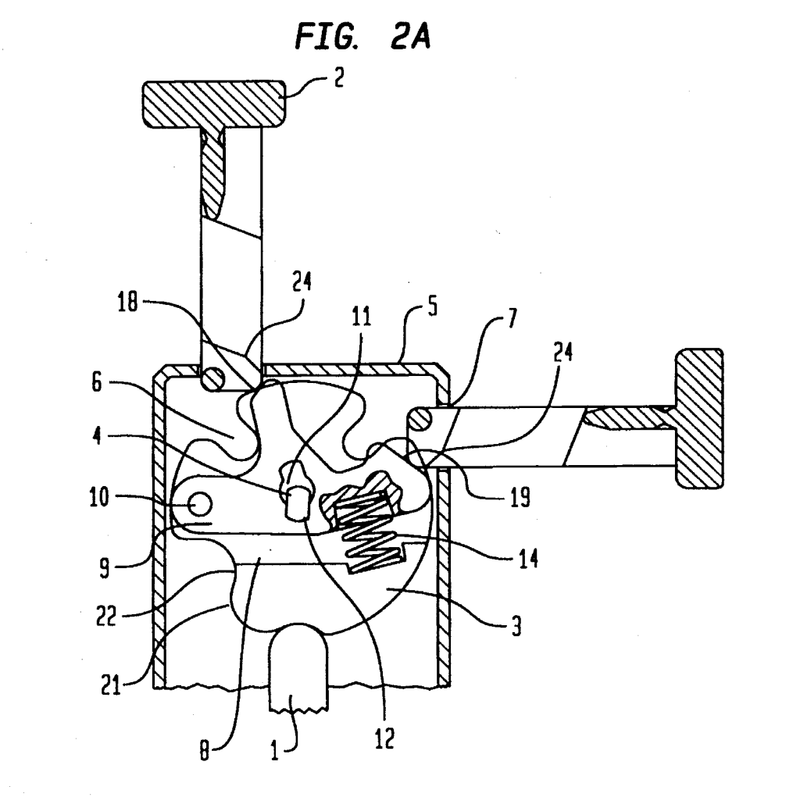
FIG. 2a is a side elevational view of the switching and locking mechanism according to FIG. 1, showing the switch wheel in a locked position.

The switching and locking mechanism includes a switch wheel 3 which is rotatably mounted on an axle 4 that is fixedly and non-rotatably secured in the housing portion 5 of the safety switch, as shown e.g. in FIG. 2a. The switch wheel 3 has two radial grooves 6 that are offset to one another by 90° and respectively engaged by the actuator 2 through insertion in the access openings 7 for rotation of the switch wheel 3 from a locked starting position to a switching position.

The housing portion 5 accommodates the entire switching and locking mechanism and may be snapped onto a switch housing (not shown) of the safety switch. As described above, the housing portion 5 is provided with two access openings 7 for selective insertion by the actuator 2, e.g. an access opening 7 in a lateral surface and access opening 7 in a top surface. As the housing portion 5 contains the entire switching and locking mechanism, this unit can easily be turned by 180° for attachment to the switch housing in two positions so that a total of four different initiation directions are available. Suitably, the unused access opening 7 in the housing portion 5 is sealed by a plug to prevent any contamination as indicated by way of example in FIG. 2d.

The switch wheel 3 is formed with a cutout 8 on each side thereof for attachment of a locking member 9 which is swingably mounted on a bearing journal 10 for movement in a direction substantially perpendicular or radial to the axle 4, with the bearing journals 10 being spaced from the axle 4 by a predetermined distance. At a central location, each locking member 9 is formed with a locking zone in form of a profiled or keyed bore 11 which is traversed by the axle 4. The bore 11 has a circular center and adjacent thereto on both sides in swiveling direction of the locking members 9 a locking groove 12 which resembles the contour of the axle 4 so as to lock the axle 4 in place.

As shown in FIG. 1, the axle 4 is formed over its entire length with keyed portions in the form of two opposing flat boundary surfaces 13 which in the locking position are snugly fitted in the grooves 12. Persons skilled in the art will understand that the keyed portions 13 may be limited to only the area passing through the keyed bore 11 of the locking members 9.

The locking members 9 are each provided with a pocket 15 for receiving a spring 14 which urges the locking members 9 into their locking position, as shown in FIG. 2a. The other end of the spring 14 rests within a recess 16 of a shoulder 17 that bounds the cutout 8 of the switch wheel 3.

As best seen in FIG. 1, the locking members 9 are configured as substantially three-armed levers, with one lateral lever arm having a bore 30 for support on the bearing journal 10. A further lever arm pointing upwards is formed at its free end with a slanted contact or ramp face 18 which is acted upon by the actuator 2 when being admitted through the upper access opening 7. A third lateral lever arm is also formed at its free end with a slanted contact or ramp face 19 which is actuated upon by the actuator 2 when entering the housing portion 5 through the lateral access opening 7.

The lower half of the switch wheel 3 forms the effective cam surface for cooperation with the switch plunger 1. The circumferential cam surface is defined by a relatively small recess 20 which merges via a cam 21 into a recess 22 of greater depth.

The operation of the switching and locking mechanism will now be described in conjunction with FIGS. 2a–2d. In the initial position, as shown in FIG. 2a, the springs 14 urge the locking members 9 in a position in which the keyed axle 4 is captured by the lower groove 12 of the bore 11. As the axle 4 is fixed in place in the housing portion 5, the locking members 9 are prevented from rotating about the axle 4 in this position. The same is true for the switch wheel 3 because the eccentric support of the locking members 9 upon the bearing journal 10 prevents a rotation of the switch wheel 3.

Figure 2B:
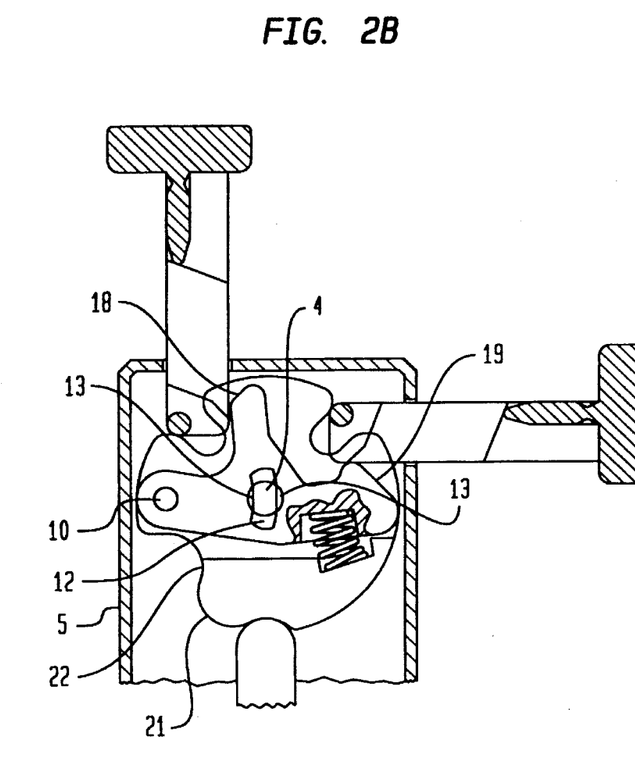
FIG. 2b is a side elevational view of the switching and locking mechanism according to FIG. 1, showing the switch wheel in a release position through actuation of an adapted actuator.

For illustrative purposes, FIG. 2a shows both access openings 7 admitting an actuator 2, and it can be seen that the ramp faces 18 and 19 of the locking members 9, which cooperate with actuator 2, are positioned spatially offset backwards in relation to the radial grooves 6 of the switch wheel 3 that cooperate with the crosslink 23 of the actuator 2, so that unlocking can only be executed with the particular supplemental keyways 24 of the actuator 2. Upon insertion of the actuator 2 through either one the access openings 7, the lateral keyways 24 act on the slanted ramp face 18 or on the slanted ramp face 19 of the locking members 9 so as to move both locking members 9 in opposition to the force of the springs 14 in a radial direction relative to the axle 4, as shown in FIG. 2b. In this intermediate position, the locking groove 12 frees the locking zone 13 of the axle 4 as the axle 4 is positioned in the central section of the bore 11. Thus, in this constellation, a rotary movement of locking members 9 about the axle 4 and thereby a rotary motion of the switch wheel 3 is made possible.

Figure 2C:
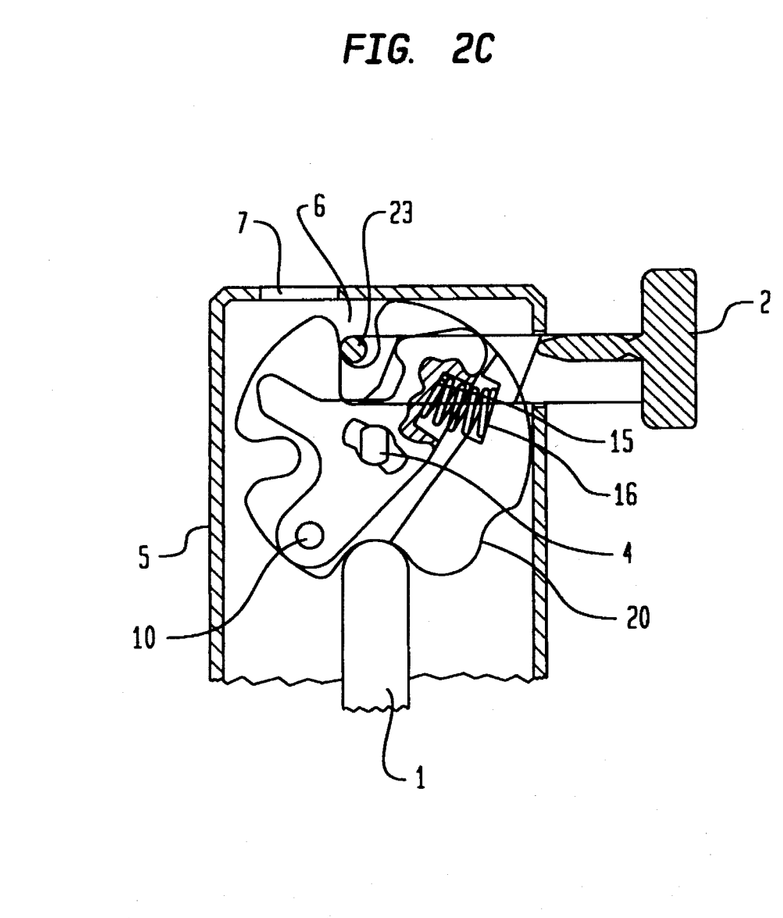
FIG. 2c is a side elevational view of the switching and locking mechanism according to FIG. 1, showing the switch wheel in a switching position.
Figure 2D:
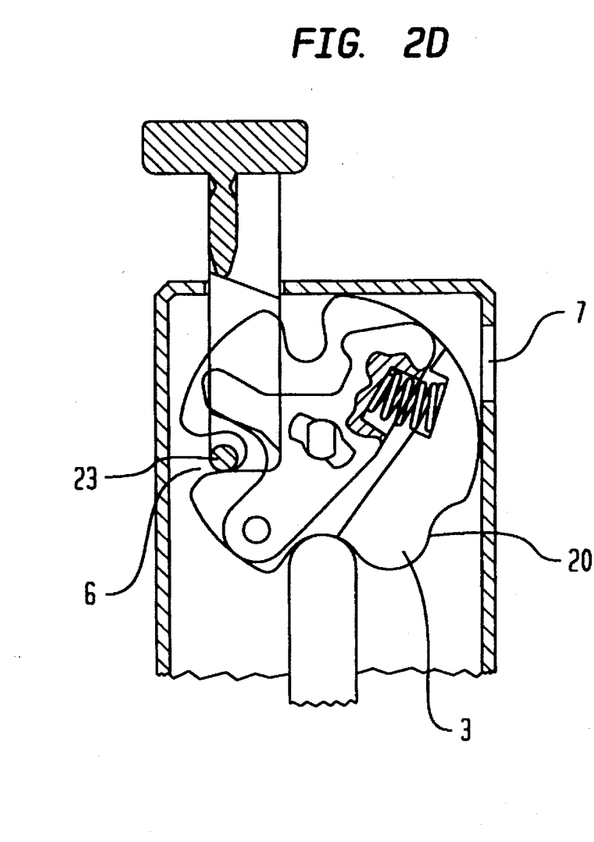
FIG. 2d is a side elevational view of the switching and locking mechanism according to FIG. 1, showing the switch wheel in the switching position, with the actuator being admitted through the other access opening.

Upon further insertion of the actuator 2 through the respectively selected access opening 7 from this position, the keyways 24 move past the slanted ramp faces 18 (or 19) of the lever arms of the locking members 9, and the crosslink 23 of actuator 2 enters the associated radial groove 6 of the switch wheel 3. The switch wheel 3 can now be turned through further insertion of the actuator 2 so that the plunger 1 exits the recess 20, moves along the cam 21 and enters the deeper recess 22 for effecting a switching operation. This position is shown in FIG. 2c. FIG. 2d shows the switching position when utilizing the upper access opening 7 for admission by the actuator 2.

Figure 3:
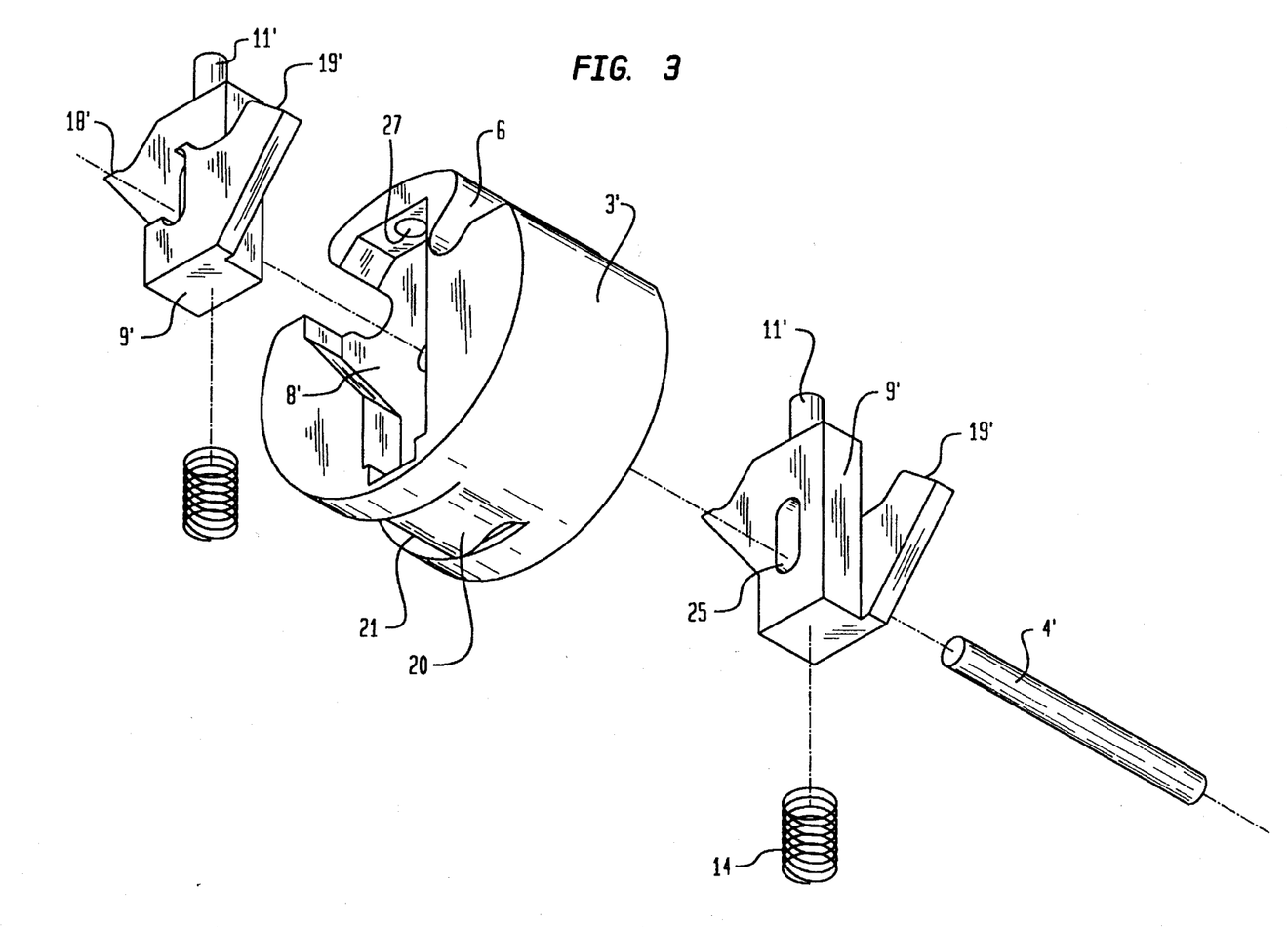
FIG. 3 is an exploded, perspective view of another embodiment of a switching and locking mechanism of a safety switch in accordance with the invention.

Turning now to FIG. 3, there is shown an exploded, perspective view of another embodiment of a switching and locking mechanism of a safety switch in accordance with the present invention, with a switch wheel 3' rotatably mounted on an axle 4' of circular cross-section. The switch wheel 3' has radial grooves 6 and a circumferential cam surface with a small recess 20 which progresses into a deeper recess 22 by way of cam curve 21. Locking members 9' are displaceably received in respective cutouts 8' on either side of the switch wheel 3' and are biased by springs 14 to seek their locking position. The springs 14 are received in suitable pockets of the cutouts 8'. Formed in the center of each locking member 9' is a longitudinal slot 25 for passage of the axle 4'.

Each locking member 9' exhibits two arm-like projections which are respectively assigned to the access openings 7, with the arm facing the lateral access opening 7 carrying at its free end a slanted contact or ramp face 19' for cooperation with the keyways 24 of the actuator 2 while the arm that faces the upper access opening 7 has a contact or ramp face 18' which extends substantially perpendicular to the direction of entry. The ramps 18' and 19' are positioned spatially offset backwards in relation to the radial grooves 6 of the switch wheel 3'. The locking zone of the locking members 9' is formed by a bolt 11' which protrudes from one end for engagement in a hole 26 in the juxtaposed area of the housing portion 5'.

Figure 4A:
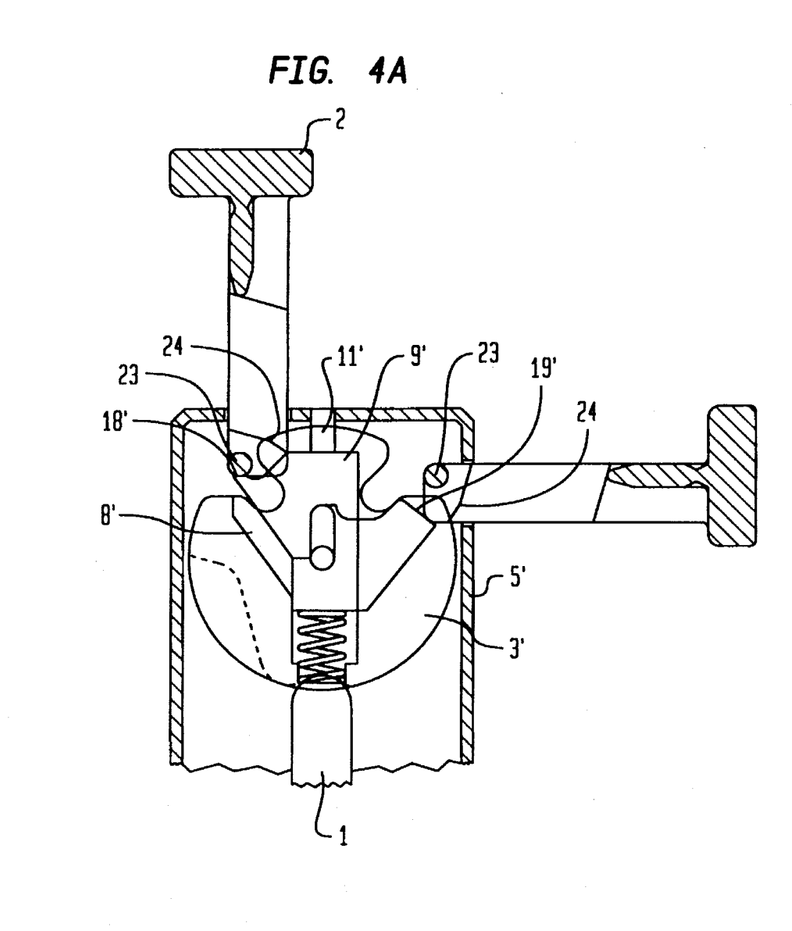
FIG. 4a is a side elevational view of the switching and locking mechanism according to FIG. 3, showing the switch wheel in a locked position.
Figure 4B:
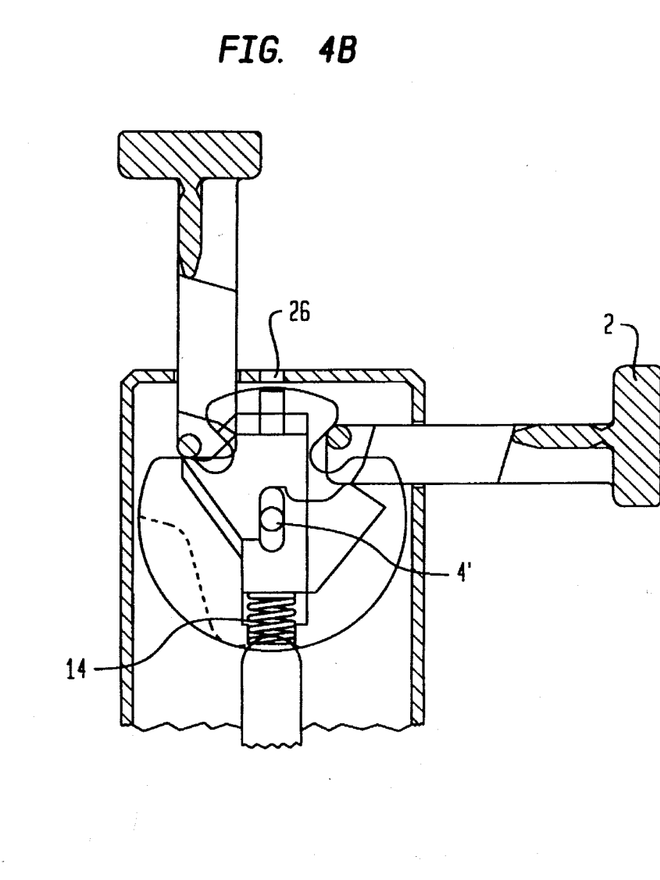
FIG. 4b is a side elevational view of the switching and locking mechanism according to FIG. 3, showing the switch wheel in a release position through actuation of an adapted actuator.
Figure 4C:
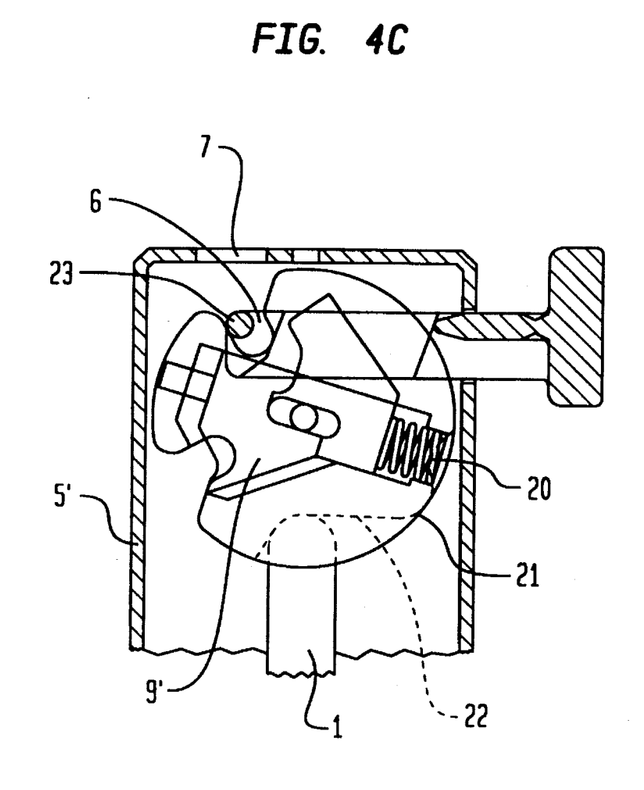
FIG. 4c is a side elevational view of the switching and locking mechanism according to FIG. 3, showing the switch wheel in a switching position.
Figure 4D:
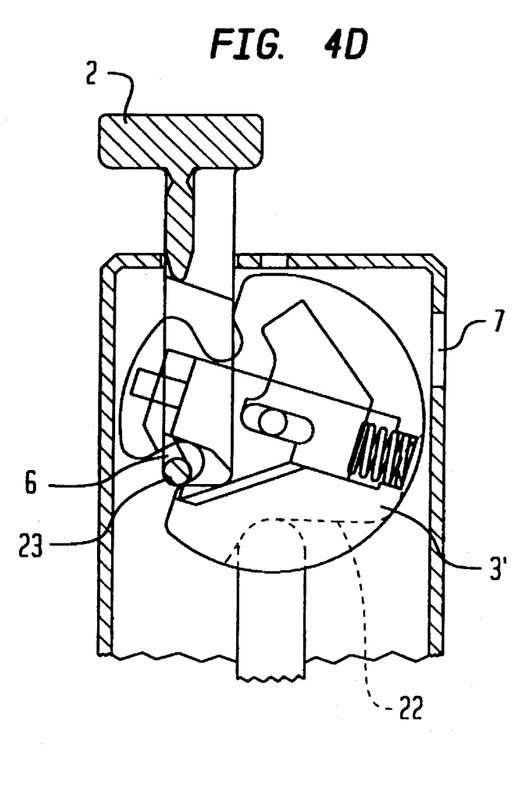
FIG. 4d is a side elevational view of the switching and locking mechanism according to FIG. 3, showing the switch wheel in the switching position, with the actuator being admitted through the other access opening.

The locking and switching mechanism operates as follows: In the locked starting position, as shown in FIG. 4a, the locking members 9' are urged by the springs 14 upwards so that the bolts 11' engage the holes 26. Thus, the locking members 9' are fixed in place. As the bolts 11' traverse also a bore 27 (FIG. 3) on each side of the switch wheel 3', and the locking members 9' are received in the cutouts 8', the switch wheel 3' is also prevented from any rotation. Upon insertion of the actuator 2 through either one of the access openings 7, the keyways 24 of the actuator 2 impact the ramp faces 18' of the locking members 9' which extend across the path of movement in the event the upper access opening 7 has been selected, or impact the ramp faces 19' in the event the lateral access opening 7 has been selected. In either case, the locking members 9' are pushed backwards against the force of the springs 14 and execute a movement in radial direction relative to the axle 4' while being guided in the cutouts 8'. Through this radial displacement, the bolt 11' exits the hole 26 in housing portion 5' and is withdrawn from the bore 27 to disable the locking action, as shown in FIG. 4b. A further insertion of the actuator 2 enables the crosslink 23 to enter one of the radial grooves 6 of the switch wheel 3' so that the switch wheel 3' together with the locking members 9' can be rotated to move the plunger 1 from the smaller recess 20 to the deeper recess 22 to effect a switching action. This position is illustrated in FIG. 4c. FIG. 4d shows the switching position upon use of the upper access opening 7 for insertion by the actuator 2.

Also this embodiment allows a repositioning of the housing portion 5' about 180° for selective attachment to the switch housing.

While the invention has been illustrated and described as embodied in a safety switch, it is not intended to be limited to the details shown since various modifications and structural changes may be made without departing in any way from the spirit of the present invention.

What is claimed as new and desired to be protected by Letters Patent is set forth in the appended claims:

I claim:

1. A safety switch, comprising:
   a housing receiving a reciprocating plunger for operating an element, said housing having two lateral access openings;
   a switch wheel rotatably mounted on an axle within said housing;

an actuator selectively insertable in one of the access openings of said housing for rotation of said switch wheel; and a locking means secured to said switch wheel and including a spring-loaded locking member arranged on each side of said switch wheel, said locking members having contact surfaces acted upon by said actuator for movement of said locking members in a substantially radial direction in relation to said axle between a locking position for inhibiting rotation of said switch wheel and a release position for allowing rotation of said switch wheel, wherein said locking members are swingably mounted to said switch wheel about a pivot axis that is distal from a central passage area of said axle, said locking members having a locking means in the passage area of said axle in form of a keyed bore with a circular passageway for said axle and a locking groove at least on one side of said circular passageway for cooperation with keyed surfaces formed on said axle.

2. The safety switch of claim 1 wherein said locking members have means for cooperation with a locking portion of said housing in said locking position.

3. The safety switch of claim 1 wherein said switch wheel is provided with radial grooves, said contact surface of said locking members being positioned spatially offset backwards in relation to said radial grooves.

4. The safety switch of claim 3 wherein said actuator has a functional end in form of a crosslink having keyways on both sides for cooperation with said contact surfaces of said locking members.

5. The safety switch of claim 4 wherein said locking members are configured as three-armed levers, with one arm rotatably supported on said switch wheel and with the remaining arms being respectively associated to said access openings and formed at their free ends with slanted contact surfaces for cooperation with said crosslink.

6. The safety switch of claim 4 wherein said locking members are provided with two projections respectively associated to said access openings and having formed at their free ends contact surfaces for cooperation with said crosslink.

7. The safety switch of claim 1 wherein said housing is of dome-shaped configuration and attachable to a switch housing in positions offset 180° from one another.

8. The safety switch of claim 1 wherein said switch wheel has a first circumferential recess of relatively small depth in a central area thereof for said plunger, a second circumferential recess of relatively greater depth that is angularly offset to said first recess, and a control cam connecting said first and second recesses.

9. The safety switch of claim 1 wherein the other one of said access openings that is not in use is tightly sealed.

10. A safety switch of a type including a housing having therein at least one access opening for admitting a specially adapted actuator, said safety switch comprising:

a rotatably mounted switch wheel adapted for rotation by said actuator;

a slidably mounted plunger operable by said switch wheel for actuating a switch;

a locking means mounted on said switch wheel for rotation therewith and moveable in a substantially radial direction between a locking position for inhibiting rotation of said switch wheel and a release position for allowing rotation of the switch wheel, said locking means being spring-loaded for seeking said locking position and exhibiting an adapted contour for cooperation with said actuator such that upon insertion of said actuator to a first extent, said locking means is displaced from said locking position to said release position, and upon insertion of said actuator to a second, greater extent, said switch wheel is rotated by said actuator for causing said switch wheel to operate said plunger; and a locking portion fixedly appurtenant to said housing, said locking portion including an axle non-rotatably secured to said housing and having at least a portion in form of keyed surfaces, said locking means being swingably mounted to said switch wheel distal from its center and including a locking groove for cooperation with said keyed surfaces of said axle for locking.

11. The safety switch of claim 10, wherein said locking means engages said locking portion in said locking position so as to be prevented from rotating relative to said housing, thereby also preventing said switch wheel from rotating relative to said housing.

12. The safety witch of claim 10 wherein said switch wheel has a circumferential cam for operating said plunger as a cam follower.

13. The safety switch of claim 10 wherein said housing has a further access opening for admission of said actuator in a direction substantially orthogonal to its admission into said first-mentioned access opening, said locking means being configured as a three-armed lever having one arm providing a rotatable bearing function on said switch wheel and remaining arms respectively associated to said access openings, with their free ends defining contact surfaces for cooperation with said actuator.

14. The safety switch of claim 10 wherein said switch wheel and said locking means are substantially coaxially mounted.

15. A safety switch, comprising:

a housing receiving a reciprocating plunger for operating an element, said housing having two lateral access openings;

a switch wheel rotatably mounted on an axle within said housing;

an actuator selectively insertable in one of the access openings of said housing for rotation of said switch wheel; and a locking means secured to said switch wheel and including a spring-loaded locking member arranged on each side of said switch wheel, said locking members having contact surfaces acted upon by said actuator for movement of said locking members in a substantially radial direction in relation to said axle between a locking position for inhibiting rotation of said switch wheel and a release position for allowing rotation of said switch wheel, wherein said locking members are slidably guided in cutouts on both sides of said switch wheel radially with respect to said axle and provided with a protruding pin that is engageable in a hole in an adjacent portion of said housing when in the locking position.

16. The safety switch of claim 15, wherein said locking members are swingably mounted to said switch wheel about a pivot axis that is distal from a central passage area of said axle, said locking members having a locking means in the passage area of said axle in form of a keyed bore with a circular passageway for said axle and a locking groove at least on one side of said circular passageway for cooperation with keyed surfaces formed on said axle.

17. The safety switch of claim 15 wherein said locking members have means for cooperation with a locking portion of said housing in said locking position.

18. The safety switch of claim 15 wherein said switch wheel is provided with radial grooves, said contact surface of said locking members being positioned spatially offset backwards in relation to said radial grooves.

19. The safety switch of claim 18 wherein said actuator has a functional end in form of a crosslink having keyways on both sides for cooperation with said contact surfaces of said locking members.

20. The safety switch of claim 19 wherein said locking members are configured as three-armed levers, with one arm rotatably supported on said switch wheel and with the remaining arms being respectively associated to said access openings and formed at their free ends with slanted contact surfaces for cooperation with said crosslink.

21. The safety switch of claim 19 wherein said locking members are provided with two projections respectively associated to said access openings and having formed at their free ends contact surfaces for cooperation with said crosslink.

22. The safety switch of claim 15 wherein said housing is of dome-shaped configuration and attachable to a switch housing in positions offset 180° from one another.

23. The safety switch of claim 15 wherein said switch wheel has a first circumferential recess of relatively small depth in a central area thereof for said plunger, a second circumferential recess of relatively greater depth that is angularly offset to said first recess, and a control cam connecting said first and second recesses.

24. The safety switch of claim 15 wherein the other one of said access openings that is not in use is tightly sealed.

25. The safety switch of claim 15, wherein said locking members are swingably mounted to said switch wheel about a pivot axis that is distal from a central passage area of said axle, said locking members having a locking means in the passage area of said axle in form of a keyed bore with a circular passageway for said axle and a locking groove at least on one side of said circular passageway for cooperation with keyed surfaces formed on said axle.

26. A safety switch of a type including a housing having therein at least one access opening for admitting a specially adapted actuator, said safety switch comprising:

a rotatably mounted switch wheel adapted for rotation by said actuator;

a slidably mounted plunger operable by said switch wheel for actuating a switch;

a locking means mounted on said switch wheel for rotation therewith and moveable in a substantially radial direction between a locking position for inhibiting rotation of said switch wheel and a release position for allowing rotation of the switch wheel, said locking means being spring-loaded for seeking said locking position and exhibiting an adapted contour for cooperation with said actuator such that upon insertion of said actuator to a first extent, said locking means is displaced from said locking position to said release position, and upon insertion of said actuator to a second, greater extent, said switch wheel is rotated by said actuator for causing said switch wheel to operate said plunger; and a locking portion fixedly appurtenant to said housing, said locking portion including a hole in said housing, said locking means being formed with a bolt traversing a bore of said switch wheel and engageable in said hole in the locking position and withdrawn therefrom in the release position.

27. The safety switch of claim 26 wherein said locking portion includes an axle non-rotatably secured to said housing and having at least a portion in form of keyed surfaces, said locking means being swingably mounted to said switch wheel distal from its center and including a locking groove for cooperation with said keyed surfaces of said axle for locking.

28. The safety switch of claim 26 wherein said locking means engages said locking portion in said locking position so as to be prevented from rotating relative to said housing, thereby also preventing said switch wheel from rotating relative to said housing.

29. The safety witch of claim 26 wherein said switch wheel has a circumferential cam for operating said plunger as a cam follower.

30. The safety switch of claim 26 wherein said housing has a further access opening for admission of said actuator in a direction substantially orthogonal to its admission into said first-mentioned access opening, said locking means being configured as a three-armed lever having one arm providing a rotatable bearing function on said switch wheel and remaining arms respectively associated to said access openings, with their free ends defining contact surfaces for cooperation with said actuator.

31. The safety switch of claim 26 wherein said switch wheel and said locking means are substantially coaxially mounted.

* * * * *